(12) United States Patent
Vashishta et al.

(10) Patent No.: US 7,689,643 B2
(45) Date of Patent: Mar. 30, 2010

(54) N-BIT CONSTANT ADDER/SUBTRACTOR

(75) Inventors: Tarun Kumar Vashishta, Haryana (IN); Priyanka Agarwal, Uttar Pradesh (IN)

(73) Assignee: STMicroelectronics Pvt. Ltd., Uttar Pradesh (IN)

(*) Notice: Subject to any disclaimer, the term of this patent is extended or adjusted under 35 U.S.C. 154(b) by 1189 days.

(21) Appl. No.: 11/262,496

(22) Filed: Oct. 27, 2005

(65) Prior Publication Data

US 2006/0161614 A1 Jul. 20, 2006

(30) Foreign Application Priority Data

Oct. 27, 2004 (IN) .................... 2113/DEL/2004

(51) Int. Cl.
*G06F 7/50* (2006.01)

(52) U.S. Cl. .................................... 708/706

(58) Field of Classification Search ............ None
See application file for complete search history.

(56) References Cited

U.S. PATENT DOCUMENTS

| | | | |
|---|---|---|---|
| 5,274,581 A * | 12/1993 | Cliff et al. ............... | 708/700 |
| 5,497,341 A * | 3/1996 | Cohen .................... | 708/706 |
| 6,807,556 B1 * | 10/2004 | McElvain ............... | 708/672 |
| 6,934,733 B1 * | 8/2005 | Gashkov et al. ........ | 708/706 |
| 7,218,139 B1 * | 5/2007 | Young et al. ........... | 326/38 |

* cited by examiner

*Primary Examiner*—David H Malzahn
(74) *Attorney, Agent, or Firm*—Lisa K. Jorgenson; Robert Iannucci; Seed IP Law Group PLLC (57) ABSTRACT

An area efficient realization of an N-bit constant coefficient adder/subtractor implemented on FPGAs, utilizing N LUTs with single output generation capability. It includes three inputs from every LUT for addition/subtraction, without any requirement for extra logic for support of arithmetic mode and carry chains. For FPGAs supporting 4-input LUTs, the concept is further enhanced with the capability to perform addition and subtraction dynamically, by exploiting the fourth unused input of the LUTs. Another embodiment involves delay-optimized realization of an N-bit constant coefficient adder/subtractor implemented on FPGAs with 4-input LUTs. LUTs in the implementation have single output generation capability without any carry generation and propagation. The implementation utilizes N+1 LUTs and gives a delay proportional to N/2 of routing resource used. However, the implementation becomes more efficient by the use of cascade chains. The delay optimization is achieved by doing computation in two parallel chains.

22 Claims, 7 Drawing Sheets

N-BIT CONSTANT ADDER/SUBTRACTOR

BACKGROUND OF THE INVENTION

1. Field of the Invention

The invention relates to an N-bit constant coefficient adder/subtractor.

2. Description of the Related Art

Figure 1:
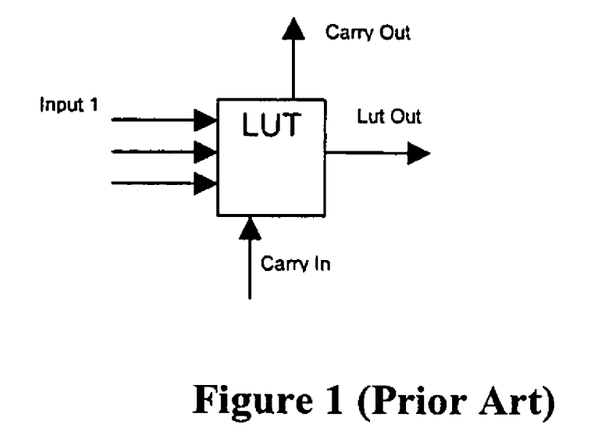

A constant coefficient adder/subtractor circuit has one operand that is a constant. In field programmable gate arrays (FPGAs) based on look-up tables (LUTs), generally two techniques are used for the implementation of such adder/subtractor. The first technique uses an arithmetic mode for implementation, as shown in FIG. 1, and the second uses LUTs in normal mode.

In LUT based FPGAs, for the implementation of adder/subtractor and likewise circuits, a special mode called arithmetic mode is supported. A 4-input LUT configured in arithmetic mode is capable of generating two specific functions as output (LUT out and Carry Out). Generally one function is used for computation of sum/difference bit and the other one for the computation of carry/borrow. In this mode, three inputs arrive through normal routing and one through carry chain (i.e. carry out of previous LUT in the LUT array).

Figure 2:
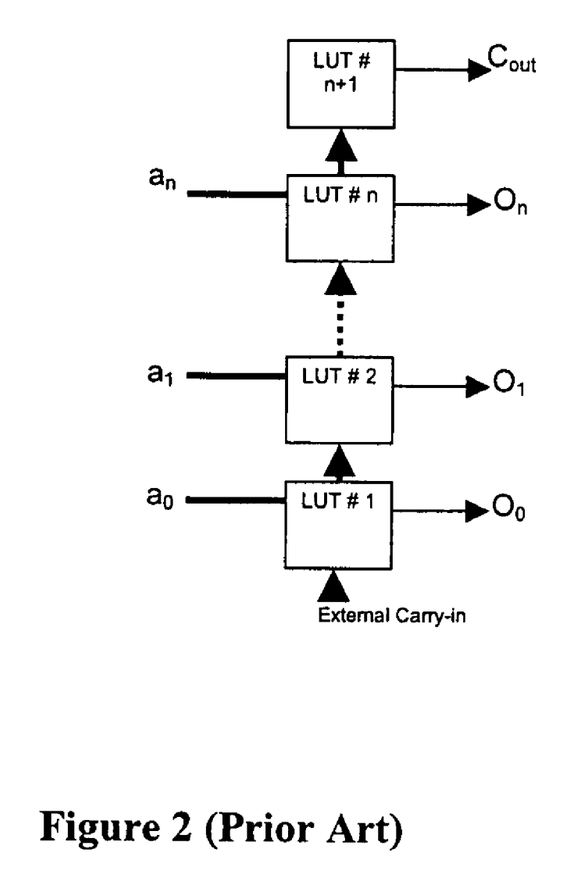
FIG. 2 shows an N-bit constant coefficient adder/subtractor using technique 1.

This technique uses a ripple carry implementation of an adder as shown in FIG. 2. The delay of the circuit is directly dependant on the number of stages through which the carry is propagated. Hence, the delay is directly proportional to the size of inputs and the delay of carry chains. Since, these carry chains are extremely fast, this implementation is well suited for LUT based FPGAs. Thus, the delay encountered in the implementation of an N-bit adder/subtractor is proportional to N+1. The same approach is used for a constant coefficient adder/subtractor.

However, the approach suffers with a drawback. Many of the post mapping optimization algorithms that can be run on LUT level net list for area/delay reduction cannot be applied on LUTs that are configured in arithmetic mode, due to the simultaneous generation of two functions from a single LUT. Thus, the advantage that could be achieved in terms of area/delay by the optimization algorithm is not obtained.

Further, the arithmetic mode uses extra logic besides the LUT. It also employs a dedicated carry chain to connect the carry output of one LUT with the carry input pin of the next LUT in the LUT array. Thus, two of the three inputs arrive through normal routing and one arrives through the carry chain (i.e. carry out of the previous LUT in the LUT array). This approach implements N-bit constant coefficient adder/subtractor in N LUTs, if carry tap out is available and in N+1 LUTs in absence of a carry tap out feature.

Figure 3:
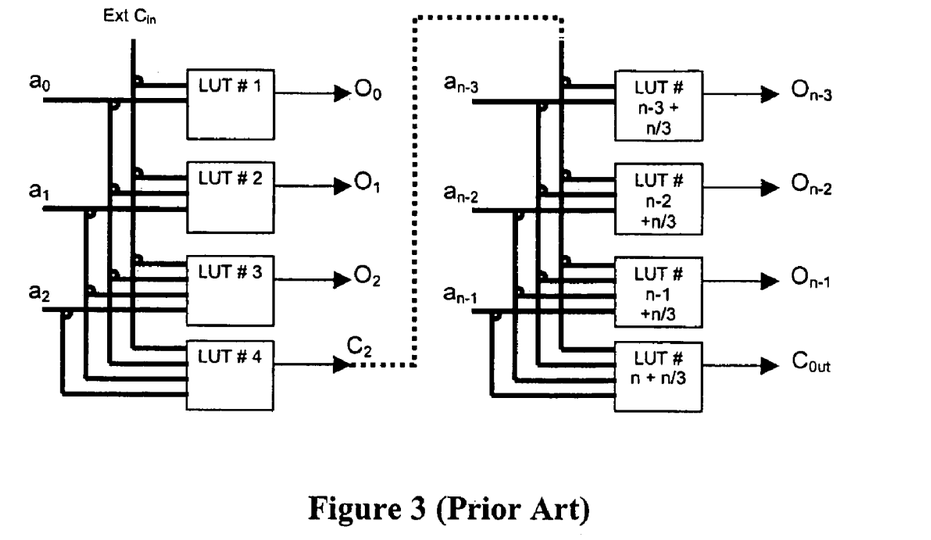
FIG. 3 illustrates an N-bit constant coefficient adder/subtractor using technique 2

FIG. 3 shows another approach that implements constant coefficient addition/subtraction without using arithmetic mode while supporting post-mapping optimization. The delay encountered in this implementation for an N-bit adder/subtractor is proportional to an N/3 delay of routing resources used. This technique however, suffers from a serious drawback. The number of 4-input LUTs required to implement an N-bit adder/subtractor, is at least (N+N/3). Thus, this kind of implementation requires almost 33% more LUTs as compared to the previous approach. Hence, even if this implementation leaves scope for optimization, no significant gain can be achieved in terms of area.

Besides, the LUT logic is not fully utilized, as N/4 LUTs use only 2 of their inputs and another N/4 LUTs use only 3 of their inputs.

Figure 4:
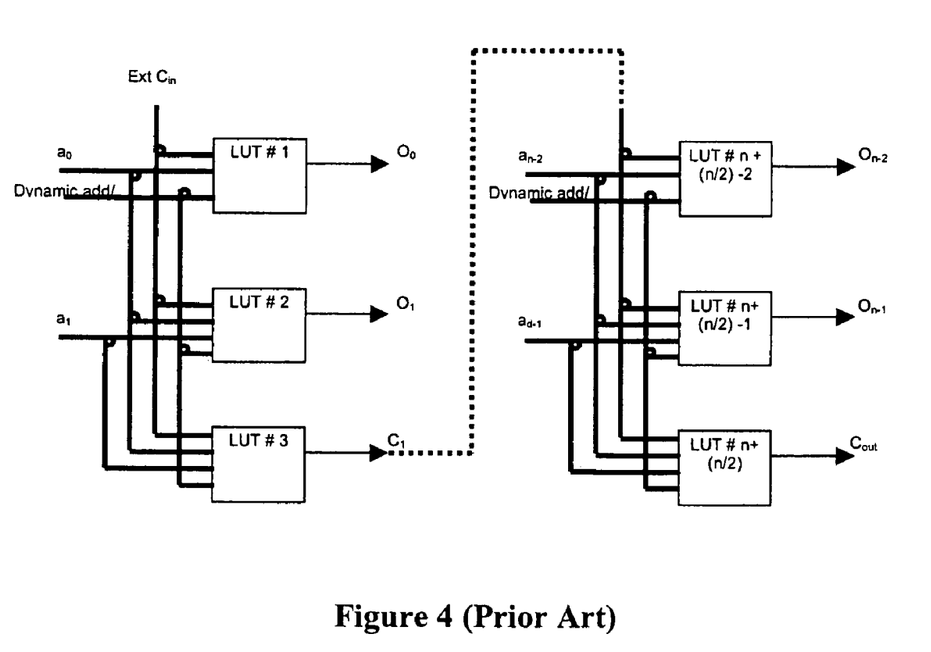
FIG. 4 shows an N-bit constant coefficient adder/subtractor, with dynamic add/sub using technique 2.

Moreover, for implementation of N-bit dynamic addition/subtraction as shown in FIG. 4, the number of 4-input LUTs requirement reaches to (N+ceil (N/2)-1). Besides this, the implementation makes non-uniform utilization of LUT logic (one third of the LUTs are underutilized).

BRIEF SUMMARY OF THE INVENTION

One embodiment of the present invention eliminates the need to embed extra logic in a logic cell to support the generation of two functions from a single LUT, i.e. support of arithmetic mode.

One embodiment of the invention eliminates the requirement of carry chains to propagate carry output.

One embodiment of the invention enables post-mapping optimization algorithms that can be run on an LUT level net list generated by the proposed method.

One embodiment of the invention reduces the delay involved in-bit propagation.

One embodiment of the invention provides an area efficient n-bit constant adder/subtractor comprising a plurality of LUTs interconnected to each other such that a first input of each LUT is coupled to $a_i$ data input bit, a second input of each LUT is coupled to $a_{i-1}$ data input bit and a third input of each LUT is coupled to the output of the previous LUT $O_{i-1}$.

The previous data input bit of first LUT is carry input Cin.

A fourth input bit of each said LUT is coupled to a dynamic add/sub select bit.

Addition/subtraction is implemented in an FPGA.

The constant adder/subtractor is configured for the case of dynamic addition/subtraction comprising the steps of:

setting a defined bit pattern corresponding to the least significant bit output for the first LUT;

for each of the remaining output bits $O_i$ performing the steps of:

selecting a first output column from first truth table based on the value of $K_i$ and $K_{i-1}$ of input constant K;

selecting a second output column from either a second or third truth table depending upon whether said $K_i$ is a minuend or subtrahend based on the value of $K_i$ and $K_{i-1}$ of input constant K;

concatenating said first and second columns to construct the input bits for the $i^{th}$ LUT.

The constant adder/subtractor is configured for the case of addition comprising the steps of:

setting a defined bit pattern corresponding to the least significant bit output for the first LUT;

for each of the remaining output bits $O_i$ performing the step of selecting an output column from first truth table based on the value of $K_i$ and $K_{i-1}$ of input constant K.

The constant adder/subtractor is configured for the case of subtraction comprising the steps of:

setting a defined bit pattern corresponding to the least significant bit output for the first LUT;

for each of the remaining output bits $O_i$ performing the step of:

selecting an output column from either a second or third truth table depending upon whether said $K_i$ is a minuend or subtrahend based on the value of $K_i$ and $K_{i-1}$ of input constant K.

The defined bit pattern is implemented using an XOR truth table.

A delay minimized n-bit constant adder/subtractor comprising a plurality of LUTs interconnected to each other such that a first input of each LUT is coupled to $a_i$ data input bit, a second input of each LUT is coupled to the $a_{i-1}$ data input bit, a third input of each LUT is coupled to $a_{i-2}$ data input bit and a fourth input of each LUT is coupled to the output of the previous LUT $O_{i-1}$.

The said constant adder/subtractor is configured for the case of addition comprising the steps of:

setting a defined first bit pattern corresponding to the least significant bit output of even bits for the first LUT;

setting a defined second bit pattern corresponding to the penultimate bit output of odd bits for the second LUT;

for each of the remaining even output bits $O_i$ performing the steps of:

selecting an output column from fourth truth table based on the value of $K_i$, $K_{i-1}$ and $K_{i-2}$ of input constant K;

for each of the remaining odd output bits $O_i$ performing the steps of:

selecting an output column from fourth truth table based on the value of $K_i$, $K_{i-1}$ and $K_{i-2}$ of input constant K.

The constant adder/subtractor is configured for the case of subtraction comprising the steps of:

setting a defined first bit pattern corresponding to the least significant bit output of even-bits for the first LUT;

setting a defined third/fourth bit pattern corresponding to the penultimate bit output of odd bits depending upon whether said $K_i$ is a minuend or subtrahend for the second LUT;

for each of the remaining even output bits $O_i$ performing the steps of:

selecting an output column from fifth or sixth truth table depending upon whether said $K_i$ is a subtrahend or minuend respectively based on the value of $K_i$, $K_{i-1}$ and $K_{i-2}$ of input constant K;

for each of the remaining odd output bits $O_i$ performing the steps of:

selecting an output column from fifth or sixth truth table depending upon whether said $K_1$ is subtrahend or minuend respectively based on the value of $K_i$, $K_{i-1}$ and $K_{i-2}$ of input constant K.

The first bit pattern is implemented using an XOR truth table.

The second bit pattern is calculated in accordance with:

$$O_1 = XOR(A_1, K_1, (A_0 K_0 + A_0 Cin + K_0 Cin)), \text{ where:}$$

$A_0$ is the first non-constant input;
$K_0$ is the first constant input;
$A_1$ is the second non-constant input;
$K_1$ is the second constant input; and
Cin is the carry input.

The third bit pattern is calculated in accordance with:

$$O_1 = XOR(A_1, K_1, ((\sim A_0) K_0 + (\sim A_0) Cin + K_0 Cin)),$$
where:

$A_0$ is the first non-constant input;
$K_0$ is the first constant input;
$A_1$ is the second non-constant input;
$K_1$ is the second constant input; and
Cin is the carry input.

The fourth bit pattern is calculated in accordance with:

$$O_1 = XOR(A_1, K_1, (A_0 (\sim K_0) + A_0 Cin + (\sim K_0) Cin)),$$
where:

$A_0$ is the first non-constant input;
$K_0$ is the first constant input;
$A_1$ is the second non-constant input;
$K_1$ is the second constant input; and
Cin is the carry input.

Figure 5:
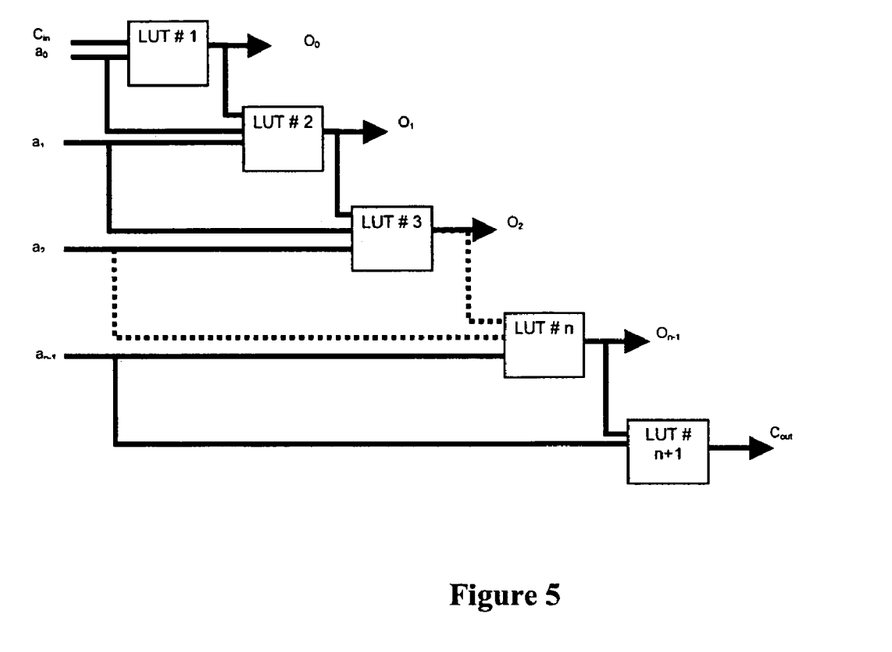
FIG. 5 illustrates an N-bit constant adder/subtractor according to one embodiment of the invention.

The proposed implementation integrates the benefits of both above explained approaches. It eliminates the need for special arithmetic mode and carry-chains and still implements an N-bit constant coefficient adder/subtractor in N+1 LUTs. Since only one bit of output is generated from a single LUT, at least N+1 LUTs are used for N-bit addition/subtraction, thus, the approach provides an area optimal solution as shown in FIG. 5.

During design synthesis of FPGAs, when constant addition/subtraction is inferred, the value of the constant operand is extracted from the design file. This approach realizes a one bit constant adder/subtractor in each LUT, where the truth table value to be stored in the $i^{th}$ LUT is decided by the synthesis tool based upon the value of $i^{th}$ and $i-1^{th}$ bits of the constant operand in one embodiment and the value of $i^{th}$, $i-1^{th}$, $i-2^{th}$ bits of the constant operand in another embodiment.

Here, each LUT, except the first LUT, takes three inputs for the implementation of the adder or subtractor. The inputs to the $i^{th}$ LUT are: $i-1^{th}$ output bit, $i-1^{th}$ non-constant input bit and $i^{th}$ non-constant input bit. The functions implemented in LUTs in the case of adder and subtractor are shown in Tables 1-3

Since, FPGAs generally contain 4-input LUTs, the fourth unused input is used to enhance the concept by incorporating the provision of dynamic addition/subtraction.

Another embodiment in accordance with the invention eliminates the need for generation of two functions simultaneously from one LUT, thus eliminating the need for arithmetic mode. The LUTs in this implementation are configured in normal mode, i.e. only one function of four inputs is generated at the output of the LUT. It thus facilitates the scope of optimization by the use of post-mapping optimization algorithms. The number of LUTs used to implement an N-bit constant coefficient adder/subtractor with the proposed technique is N+1, which is the minimum number of LUTs used to generate N+1 bits of outputs from single output LUTs.

Figure 6:
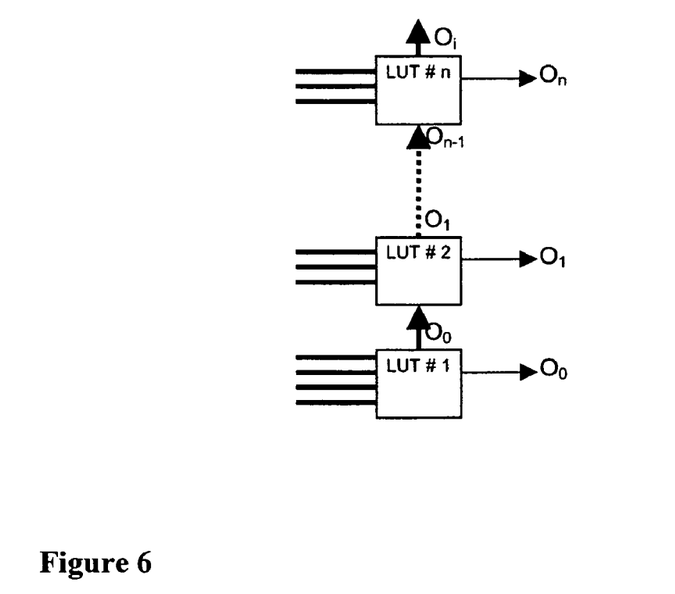
FIG. 6 shows the cascade chain.

Yet another embodiment makes the implementation more efficient with the use of cascade chains. It refers to a particular implementation of cascade chains in which LUT-out of one LUT can be given as one of the inputs to the next LUT in the LUT array through cascade chains as shown in FIG. 6 since the cascade chains are as fast as carry chains. Thus the delay that could be encountered due to the use of normal routing resources is minimized.

Besides, a LUT in cascade mode still implements a single function at the output of the LUT, thus facilitating optimization through post-mapping optimization algorithms.

BRIEF DESCRIPTION OF THE SEVERAL VIEWS OF THE DRAWINGS

FIG. 1 shows an arithmetic mode LUT with three external inputs, and one implicit input as carry in.

DETAILED DESCRIPTION OF THE INVENTION

One proposed implementation of the present invention integrates the benefits of prior art approaches. It also eliminates the need for special arithmetic mode and carry-chains and still implements N-bit constant coefficient adder/subtractor in N+1 LUTs. Since only one bit of output is generated from a single LUT, at least N+1 LUTs are used for N-bit addition/subtraction, thus, the approach provides an area optimal solution.

FIG. 5 illustrates an N-bit constant adder/subtractor according to one embodiment of the present invention. During design synthesis of FPGAs, when the constant addition/subtraction is inferred, the value of the constant operand is extracted from the design file. This approach realizes a one bit constant adder/subtractor in each LUT, where the truth table value to be stored in the ith LUT is decided by the synthesis tool based upon the value of ith and i-1th bits of the constant operand. Here, each LUT, except the first LUT, takes three inputs for the implementation of adder or subtractor. The inputs to the $i^{th}$ LUT are: the $i-1^{th}$ output bit, the $i-1^{th}$ non-constant input bit and the $i^{th}$ non-constant input bit. FIG. 6 shows a cascaded version of the instant invention.

Figure 7:
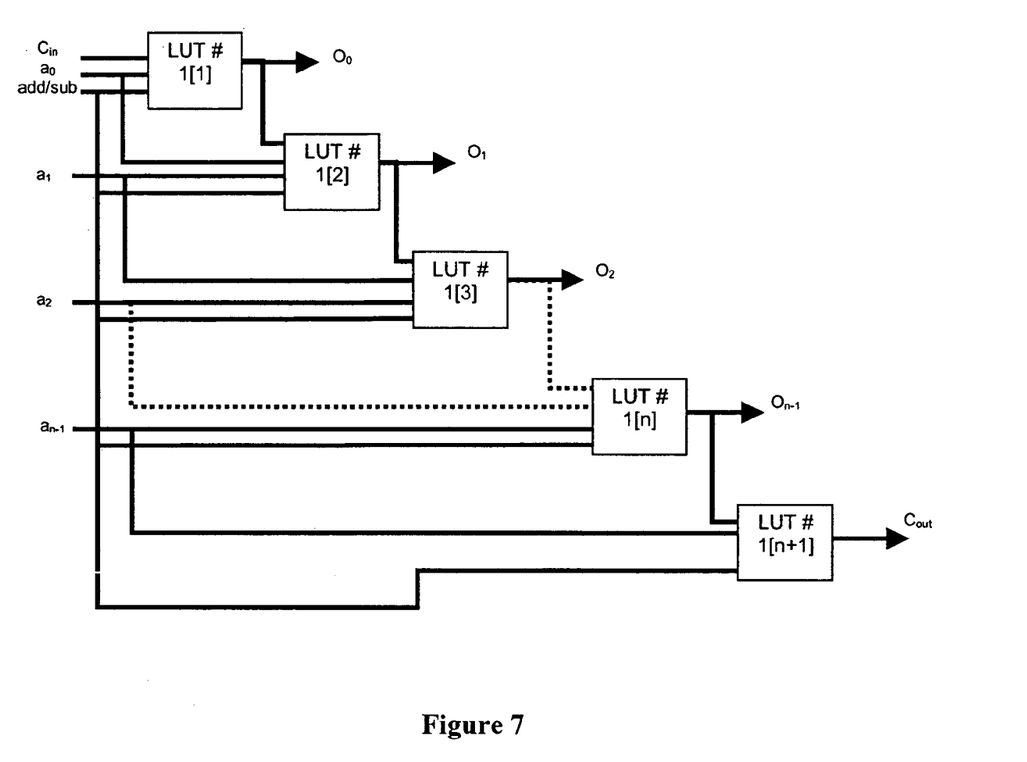
FIG. 7 illustrates LUT connectivity of an N-bit constant coefficient dynamic adder/subtractor.

The proposed method works by calculating one bit of sum/difference in every 4-input LUT, where one of the inputs is constant. FIG. 7 shows the interconnection of n LUTs in accordance with one embodiment of the invention. Each LUT 1[1:N] has four inputs with the first input connected to the $i-1^{th}$ non-constant input bit; the second input is connected to the $i^{th}$ non-constant input bit, the third input connected to the $i-1^{th}$ output while the last input is connected to a dynamic add/sub selection line for performing $i^{th}$ bit addition/subtraction. The first input of LUT 1[1] is an external carry-in bit. The LUT 1[1] performs the function of an ordinary one bit dynamic adder/subtractor with carry-in. The output of LUT 1[1] gives the least significant bit (LSB) of the sum or difference depending on the value of the dynamic add/sub selection line.

All the remaining LUTs have a different configuration and are connected to each other as shown in the figure with said inputs. The last LUT 1[n+1], which is used to generate a carryout ($C_{out}$), considers the $i^{th}$ non-constant input to be zero. Depending on the value of constant bits $K_i$ and $K_{i-1}$, different functions are implemented in different LUTs, which are decided by the synthesis tool at run time.

Truth table values for the functions $f_0$ to $f_7$ are given in the tables 1, 2 and 3 for the adder and subtractor. All the functions $f_0 \ldots f_7$ used for the generation of output bits $O_i$ (i=0, LSB) are functions of the three inputs $O_{i-1}$, $a_{i-1}$ and $a_i$. The functions as represented in Boolean form are as follows:

$$f_0=(O_{i-1}*a_{i-1}*a_i)+(O_{i-1}*(\sim a_{i-1})*(\sim a_i))+ \\ ((\sim O_{i-1})*a_{i-1}*a_i)+((\sim O_{i-1})*(\sim a_{i-1})*a_i)$$

$$f_1=(O_{i-1}*a_{i-1}*a_i)+(O_{i-1}*(\sim a_{i-1})*(\sim a))+ \\ ((\sim O_{i-1})*a_{i-1}*(\sim a_i))+((\sim O_{i-1})*(\sim a_{i-1})*(\sim a_i))$$

$$f_2=(O_{i-1}*a_{i-1}*(\sim a_i))+(O_{i-1}*(\sim a_{i-1})*a_i)+ \\ ((\sim O_{i-1})*a_{i-1}*(\sim a_i))+((\sim O_{i-1})*(\sim a_{i-1})*(\sim a))$$

$$f_3=(O_{i-1}*a_{i-1}*(\sim a_i))+(O_{i-1}*(\sim a_{i-1})*a_i)+ \\ ((\sim O_{i-1})*a_{i-1}*a_i)+((\sim O_{i-1})*(\sim a_{i-1})*a_i)$$

$$f_4=(O_{i-1}*a_{i-1}*(\sim a_i))+(O_{i-1}*(\sim a_{i-1})*(\sim a_i))+ \\ ((\sim O_{i-1})*a_{i-1}*a_i)+((\sim O_{i-1})*(\sim a_{i-1})*(\sim a_i))$$

$$f_5=(O_{i-1}*a_{i-1}*a_i)+(O_{i-1}*(\sim a_{i-1})*a_i)+ \\ ((\sim O_{i-1})a_{i-1}*a_i)+((\sim O_{i-1})*(\sim a_{i-1})*(\sim a_i))$$

$$f_6=(O_{i-1}*a_{i-1}*a_i)+(O_{i-1}*(\sim a_{i-1})*a_i)+ \\ ((\sim O_{i-1})*a_{i-1}*(\sim a_i))+((\sim O_{i-1})*(\sim a_{i-1})*a_i)$$

$$f_7=(O_{i-1}*a_{i-1}*(\sim a_i))+(O_{i-1}*(\sim a_{i-1})*(\sim a_i))+ \\ ((\sim O_{i-1})*a_{i-1}*(\sim a_i))+((\sim O_{i-1})*(\sim a_{i-1})*a_i),$$

where:

$O_{i-1}$ is the output of the $i^{th}$ bit (i!=0) addition/subtraction, $a_{i-1}$ is the $i-1^{th}$ bit of a non-constant input, $a_i$ is the $i^{th}$ bit of the non-constant input, ~ is NOT,

* is AND, and

+ is OR operator, with precedence relation as: ~>*>+.

In Tables 1-3:

$K_i$ is the $i^{th}$ bit of a constant operand.

$K_{i-1}$ is the $i-1^{th}$ bit of the constant operand.

a−K/K−a, is the selection line for constant coefficient subtraction, which specify whether the constant is subtractor or subtrahend.

In FIG. 7, add/sub is the dynamic addition/subtraction selection line.

Figure 8:
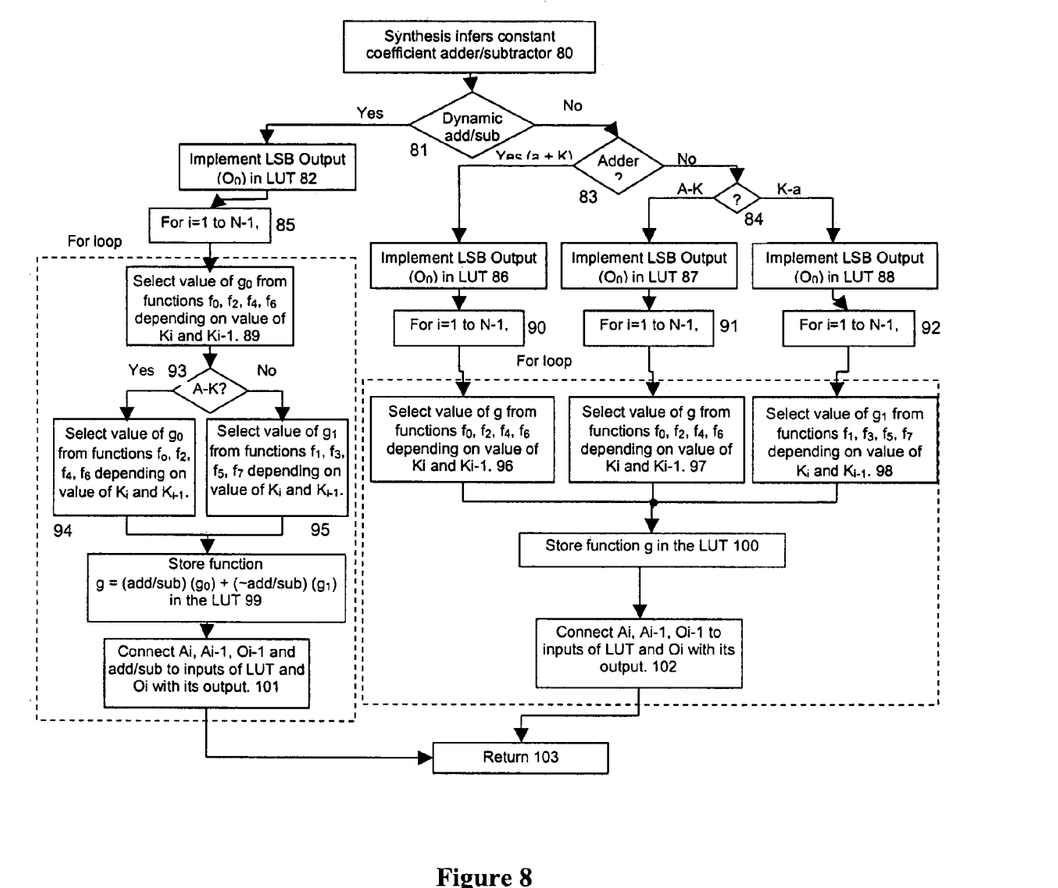
FIG. 8 shows the flowchart in accordance with one embodiment.

FIG. 8 shows the flowchart that highlights the functioning of one embodiment of the invention. In step 80, synthesis infers a constant coefficient adder/subtractor/dynamic adder/subtractor from a design file and calls a macro generator system for its implementation. The macro generator checks if it's a call for dynamic adder/subtractor, or for adder or subtractor, step 81. If dynamic addition or subtraction is to be performed, then the flow proceeds in accordance with the steps 82, 85, 89, 93, 94, 95, 99 and 101, else a decision is made on whether addition or subtraction is to be performed, step 83. In case subtraction is to be performed, the constant is checked as to whether it is minuend or subtrahend, step 84. If the constant is subtrahend, flow proceeds through steps 87, 91, 97, 100, 102 while if the constant is minuend, flow proceeds through steps 88, 92, 98, 100, 102. If addition is to be performed flow proceeds in accordance with the steps 86, 90, 96, 100, and 102.

The first step in the dynamic adder/subtractor implementation is calculation of the LSB output ($O_0$) in LUT 1[1], step 82. The LSB bit of input and external carry in (if exists) is connected at the input of the LUT 1[1] and the function that is implemented is $O_0$=XOR ($A_0$, $K_0$, Cin). A loop is run (n−1) number of times to implement n-bit dynamic addition/subtraction, step 85. The function for adder is g0 and the function for subtractor is $g_1$. The function value for adder g0 for the penultimate bit to the MSB is selected from the functions $f_0$, $f_2$, $f_4$, $f_6$ depending on value of $K_i$ and $K_{i-1}$ listed in the Table 1, step 89, i.e. a column corresponding to the values of $K_i$ and $K_{i-1}$ from Table 1 is selected. The function value $g_1$ for subtractor is selected, based on whether the constant is subtrahend or minuend, from the tables 2 or 3, step 94 or 95 i.e. a column corresponding to the values of $K_i$ and $K_{i-1}$ from tables 2 or 3 is selected. The final function g is calculated as (~add/sub) g0+(add/sub) g1 to be implemented for dynamic add-sub, step 99, i.e. the two columns are concatenated to yield the final function. Once the output function is calculated, the inputs $a_i$, $a_{i-1}$, $O_{i-1}$ and add/sub are connected to the inputs of respective LUT and $O_i$ with its output, step 101. The process is repeated for n-bit addition/subtraction.

In case addition/subtraction is performed, the LSB output ($O^0$) in LUT 1[1] is calculated, step 86, 87 or 88. The LSB bit of input and external carry in (if exists) is connected at the input of the LUT 1[1] and the function that is implemented is $O_0$=XOR ($A_0$, $K_0$, Cin). A loop is run n number of times to implement n-bit addition/subtraction, step 90, 91 or 92. In case of addition, a function value for g for the penultimate bit to the MSB is selected from the functions $f_0$, $f_2$, $f_4$, $f_6$ depending on value of $K_i$ and $K_{i-1}$ as listed in the table 1, step 96, i.e. a column corresponding to the values of $K_i$ and $K_{i-1}$ from table 1 is selected. In case of subtractor a function value g for penultimate bit to MSB is selected from the functions $f_0$, $f_2$, $f_4$, $f_6$ (if constant is subtrahend) or $f_1$, $f_3$, $f_5$, $f_7$ (if constant is minuend) depending on the value of $K_i$ and $K_{i-1}$ listed in the tables 2 or 3, step 97 or 98, i.e. a column corresponding to the values of $K_i$ and $K_{i-1}$ from tables 2 or 3 is selected. The output function thus obtained is stored in the LUT, step 100 and the inputs $a_i$, $a_{i-1}$ and $O_{i-1}$ are connected to the inputs of respective LUT and $O_i$ with its output, step 102. The process is repeated for n-bit addition/subtraction.

The approach is illustrated with the help of an example for A+K, where K is a constant coefficient as shown in Table 1,
A=0110 1101, $C_{in}$=1,
K=1101 0001, and
O=0011 1111.
Here, LSB $O_0$ is calculated by simple addition logic in the LUT:

$$O_0 = XOR(A_0, K_0, Cin).$$

There onwards, $O_i$ is calculated through the function that is based on value of constant coefficient bits ($K_i$, $K_{i-1}$). $O_i$ is located in the corresponding row of $a_{i-1}$, $O_{i-1}$ and $a_i$.

TABLE 1

| | | | A + K | | | |
|---|---|---|---|---|---|---|
| | Ki, Ki − 1 | | 00 | 01 | 10 | 11 |
| $a_{i-1}$ | $O_{i-1}$ | $a_i$ | F6 | F2 | F4 | F0 |
| 0 | 0 | 0 | 0 | 1 | 1 | 0 |
| 0 | 0 | 1 | 1 | 0 | 0 | 1 |
| 0 | 1 | 0 | 0 | 0 | 1 | 1 |
| 0 | 1 | 1 | 1 | 1 | 0 | 0 |
| 1 | 0 | 0 | 1 | 1 | 0 | 0 |
| 1 | 0 | 1 | 0 | 0 | 1 | 1 |
| 1 | 1 | 0 | 0 | 1 | 1 | 0 |
| 1 | 1 | 1 | 1 | 0 | 0 | 1 |

An example for A−K, where K is a constant coefficient is shown in table 2, where:
A=0110 1011, $B_{in}$=0,
K=0001 1001, and
O=0101 0010,
Here, LSB $O_0$ is calculated by simple subtractor logic in the LUT:

$$O_0 = XOR(A_0, K_0, Cin).$$

There onwards, $O_i$ is calculated through the function that is based on the values of constant coefficient bits ($K_i$, $K_{i-1}$). $O_i$ is located in the corresponding row of $a_{i-1}$, $O_{i-1}$ and $a_i$.

TABLE 2

| | | | A − K | | | |
|---|---|---|---|---|---|---|
| | Ki, Ki − 1 | | 00 | 01 | 10 | 11 |
| $a_{i-1}$ | $O_{i-1}$ | $a_i$ | F0 | F4 | F2 | F6 |
| 0 | 0 | 0 | 0 | 1 | 1 | 0 |
| 0 | 0 | 1 | 1 | 0 | 0 | 1 |
| 0 | 1 | 0 | 1 | 1 | 0 | 0 |
| 0 | 1 | 1 | 0 | 0 | 1 | 1 |
| 1 | 0 | 0 | 0 | 0 | 1 | 1 |

TABLE 2-continued

| | | | A − K | | | |
|---|---|---|---|---|---|---|
| | Ki, Ki − 1 | | 00 | 01 | 10 | 11 |
| $a_{i-1}$ | $O_{i-1}$ | $a_i$ | F0 | F4 | F2 | F6 |
| 1 | 0 | 1 | 1 | 1 | 0 | 0 |
| 1 | 1 | 0 | 0 | 1 | 1 | 0 |
| 1 | 1 | 1 | 1 | 0 | 0 | 1 |

An example for K−A, where K is constant coefficient is shown in table 3, where:
K=0110 1011, $B_{in}$=0,
A=0001 1001, and
O=0101 0010.
Here, LSB $O_0$ is calculated by simple subtractor logic in the LUT:

$$O_0 = XOR(A_0, K_0, Cin).$$

There onwards, $O_i$ is calculated through the function that is based on the values of constant coefficient bits ($K_i$, $k_{i-1}$). $O_i$ is located in the corresponding row of $a_{i-1}$, $O_{i-1}$ and $a_i$.

TABLE 3

| | | | K − A | | | |
|---|---|---|---|---|---|---|
| | Ki, Ki − 1 | | 00 | 01 | 10 | 11 |
| $a_{i-1}$ | $O_{i-1}$ | $a_i$ | F7 | F3 | F5 | F1 |
| 0 | 0 | 0 | 0 | 0 | 1 | 1 |
| 0 | 0 | 1 | 1 | 1 | 0 | 0 |
| 0 | 1 | 0 | 1 | 0 | 0 | 1 |
| 0 | 1 | 1 | 0 | 1 | 1 | 0 |
| 1 | 0 | 0 | 1 | 0 | 0 | 1 |
| 1 | 0 | 1 | 0 | 1 | 1 | 0 |
| 1 | 1 | 0 | 1 | 1 | 0 | 0 |
| 1 | 1 | 1 | 0 | 0 | 1 | 1 |

Figure 9:
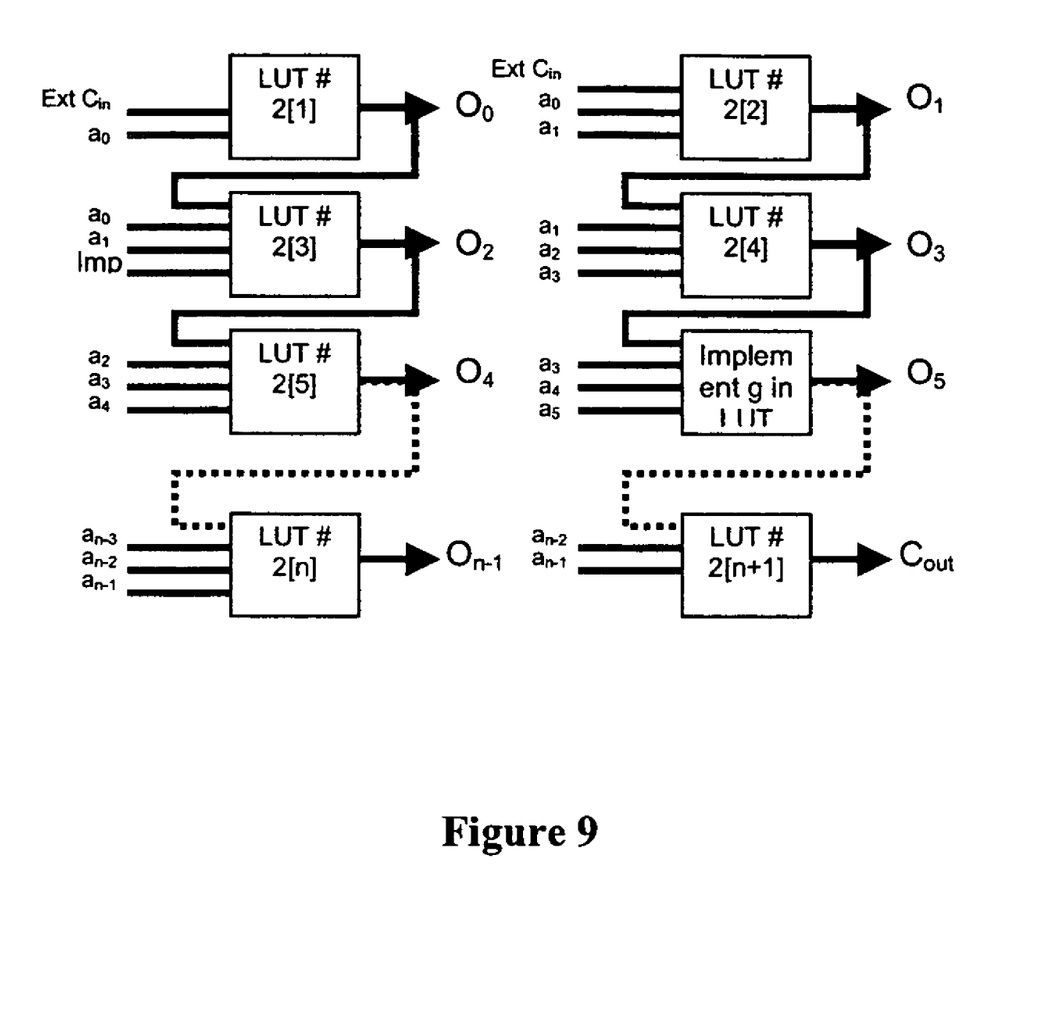
FIG. 9 shows LUT connectivity of a delay optimized N-bit constant coefficient adder/subtractor.

Another embodiment of the invention works by calculating one bit of sum/difference in every LUT, where, one of the inputs is constant. The connectivity is as shown in FIG. 9.

The LUT2[1] is connected with only two inputs: external carry-in, and the LSB of the non-constant input $a_0$. This LUT performs the function of an ordinary one bit adder/subtractor with carry-in. Similarly, LUT2[2] takes three inputs: external carry-in, LSB and penultimate LSB of the non-constant input to generate the penultimate LSB of the output.

All the remaining LUTs have a different configuration and take four inputs. The inputs to the LUT performing the $i^{th}$ bit addition/subtraction are the i-$2^{th}$ output, i-$2^{th}$, i-$1^{th}$ and $i^{th}$ non-constant input bits. The last LUT, which is used to generate carryout, considers the $i^{th}$ non-constant input to be zero. Depending on the value of constant bits, different functions are implemented in different LUTs, which are decided by the synthesis tool at run time.

Truth table values for the functions $F_0$ to $F_{23}$ are given in the tables 4, 5 and 6 for adder and subtractor below. All the functions $F_0 \ldots F_{23}$ are four input functions of $O_{i-2}$, $a_{i-2}$, $a_{i-2}$, and $a_i$. The functions in the Boolean expression form can be expressed as follows:

$F_0=F_{22}=(\sim a_i)*((\sim a_{i-1})*(a_{i-2})*O_{i-2})+a_i*(a_{i-2}+a_{i-1}+(\sim O_{i-2}))$ $F_1=F_{20}=(\sim a_i)*(a_{i-2}+a_{i-1}+(\sim O_{i-2}))+a_i*((\sim a_{i-1})*(\sim a_{i-2})*O_{i-2})$ $F_2=F_{18}=(\sim a_i)*((\sim a_{i-1})+(\sim a_{i-2})*O_{i-2})+a_i*a_{i-1}*(a_{i-2}+(\sim O_{i-2}))$ $F_3=F_{16}=(\sim a_i)*a_{i-1}*(a_{i-2}+(\sim O_{i-2}))+a_i*((\sim a_{i-1})+(\sim a_{i-2})*O_{i-2})$ $F_4=F_{14}=(\sim a_i)*(\sim a_{i-1})*((\sim a_{i-2})+O_{i-2})+a_i*(a_{i-1}+(a_{i-2}*(\sim O_{i-2})))$ $F_5=F_{12}=(\sim a_i)*(a_{i-1}+(a_{i-2}*(\sim O_{i-2})))+a_i*(\sim a_{i-1})*((\sim a_{i-2})+O_{i-2})$ $F_6=F_{10}=(\sim a_i)*((\sim a_{i-2})+(\sim a_{i-1})+O_{i-2})+a_i*a_{i-1}*a_{i-2}*(\sim O_{i-2})$ $F_7=F_8=(\sim a_i)*a_{i-1}*a_{i-2}*(\sim O_{i-2})+a_i*((\sim a_{i-2})+(\sim a_{i-1})+O_{i-2})$ $F_9=(\sim a_i)*((\sim a_{i-1})+(\sim a_{i-2})+(\sim O_{i-2}))+a_i*(a_{i-1}*a_{i-2}*O_{i-2})$ $F_{11}=(\sim a_i)*(a_{i-1}*a_{i-2}*O_{i-2})+a_i*((\sim a_{i-1})+(\sim a_{i-2})+(\sim O_{i-2}))$ $F_{13}=(\sim a_i)*(\sim a_{i-1})*((\sim a_{i-2})+(\sim O_{i-2}))+a_i*(a_{i-1}+(a_{i-2}*O_{i-2}))$ $F_{15}=(\sim a_i)*(a_{i-1}+(a_{i-2}*O_{i-2}))+a_i*(a_{i-1})*((\sim a_{i-2})+(\sim O_{i-2}))$ $F_{17}=(\sim a_i)*((\sim a_{i-1})+(\sim a_{i-2})*(\sim O_{i-2}))+a_i*(a_{i-1}*(a_{i-2}+O_{i-2}))$ $F_{19}=(\sim a_i)*(a_{i-1}*(a_{i-2}+O_{i-2}))+a_i*((\sim a_{i-1})+(\sim a_{i-2})*(\sim O_{i-2}))$ $F_{21}=(\sim a_i)*((\sim a_{i-1})*(\sim a_{i-2})*(\sim O_{i-2}))+a_i*(a_{i-1}+a_{i-2}+O_{i-2})$ $F_{23}=(\sim a_i)*(a_{i-1}+a_{i-2}+O_{i-2})+a_i*((\sim a_{i-1})*(\sim a_{i-2})*(\sim O_{i-2}))$, where:

$O_{i-2}$ is the output of the i-2$^{th}$ bit addition/subtraction,
$a_{i-2}$ is the i-2$^{th}$ bit of non constant input,
$a_{i-1}$ is the i-1$^{th}$ bit of non constant input,
$a_i$ is the i$^{th}$ bit of non constant input,
~ is NOT,
* is AND, and
+ is OR operator,
with precedence relation as: ~>*>+.

In tables 4-6:

a–K/K–a is the selection line for constant coefficient subtraction, which specify whether the constant is subtractor or subtrahend;

$K_i$ is the i$^{th}$ bit of the constant operand;
$K_{i-1}$ is the i-1$^{th}$ bit of the constant operand; and
$K_{i-2}$ is the i-2$^{th}$ bit of the constant operand.

Figure 10:
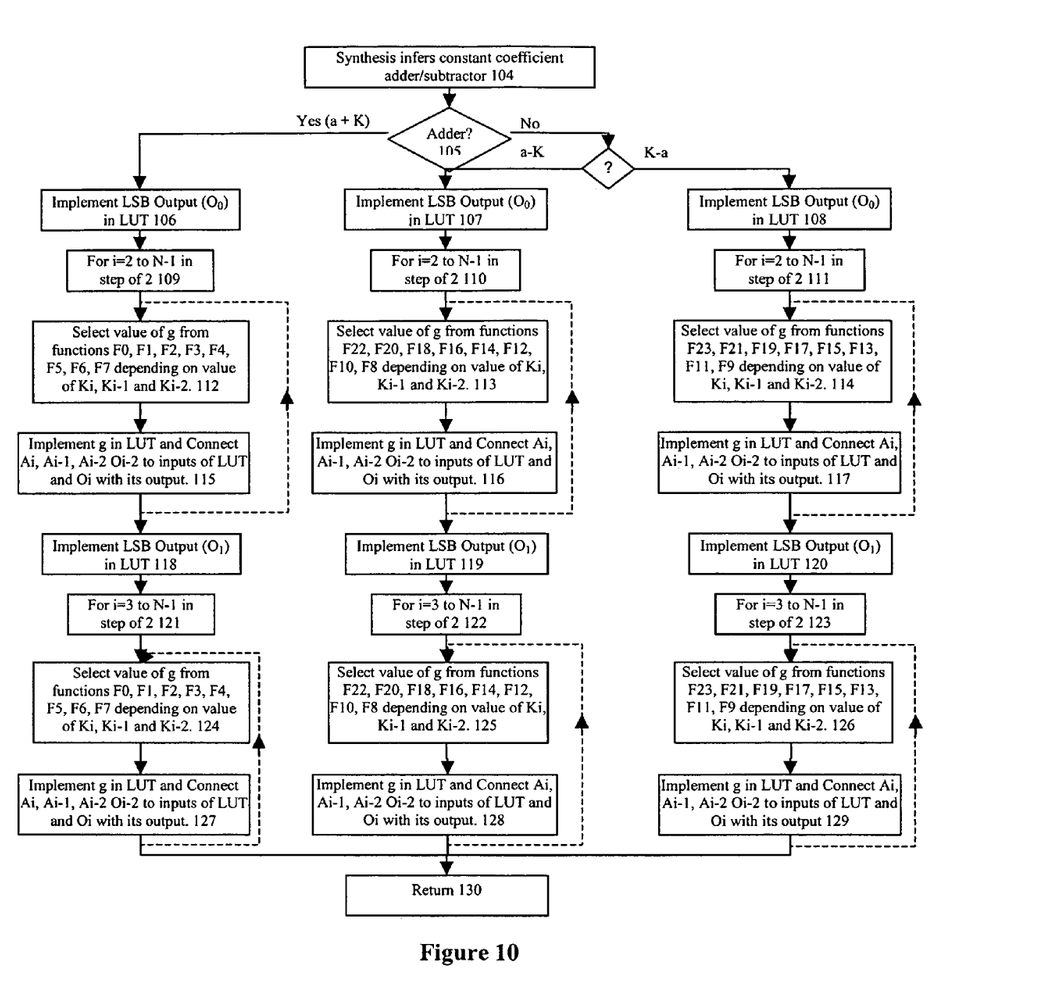
FIG. 10 shows an algorithm flow for implementing a constant coefficient adder/subtractor.

FIG. 10 shows the flowchart that highlights the functioning of the proposed embodiment. In step 104, synthesis infers a constant coefficient adder/subtractor from a design file and calls macro generator system for its implementation. The macro generator checks if it's a call for adder or subtractor, step 105. In case subtraction is to be performed, it checks if the constant is minuend or subtrahend. Accordingly, one of the 3 flows is selected.

LSB output ($O_0$) in LUT 2[1] is calculated, step 106, 107 or 108. The LSB bit of input and external carry in (if exists) is connected at the input of the LUT 2[1] and the function that is implemented is $O_0$=XOR ($A_0$, $K_0$, Cin). In case of addition, a loop is run to implement n-bit addition for even bits, step 109. A function value for g is selected from the functions F0, F1, F2, F3, F4, F5, F6, F7 depending on the values of $K_i$, $K_{i-1}$ and $K_{i-2}$ by selecting a column from table 4, step 112. The output function thus obtained is stored in the LUT and the inputs $a_i$, $a_{i-1}$, $a_{i-2}$ and Oi-2 are connected to the inputs of respective LUT and Oi with its output, step 115. The process is repeated for n-bit addition.

LSB output (O.) in LUT 2[2] is calculated in accordance with $O_1$=XOR ($A_1$, $K_1$, ($A_0K_0+A_0$Cin+$K_0$Cin)), step 118. Another loop is run to implement n-bit addition for odd bits, step 121. A function value for g is selected from the functions F0, F1, F2, F3, F4, F5, F6, F7 depending on the values of $K_i$, $K_{i-1}$ and $K_{i-2}$ by selecting a column from table 4, step 124. The output function thus obtained is stored in the LUT and the inputs $a_i$, $a_{i-1}$, $a_{i-2}$ and $O_{i-2}$ are connected to the inputs of respective LUT and Oi with its output, step 127. The process is repeated for n-bit addition.

In the case of a subtractor, a loop is run to implement n-bit subtraction for even bits, step 110 or 111, a function value g for all the even bits is selected from the functions F22, F20, F18, F16, F14, F12, F10, F8 (if constant is subtrahend) or F23, F21, F19, F17, F15, F13, F11, F9 (if constant is minuend) depending on the values of $K_i$, $K_{i-1}$ and $K_{i-2}$ by selecting a column from tables 5 or 6, step 113 or 114. The output function thus obtained is stored in the LUT and the inputs $a_i$, $a_{i-1}$, $a_{i-2}$ and Oi-2 are connected to the inputs of respective LUT and Oi with its output, step 116 or 117. The process is repeated for all the even bits.

LSB output ($O_1$) in LUT 2[2] is calculated in accordance with $O_1$=XOR ($A_1$, $K_1$, ((~$A_0$) $K_0$+(~$A_0$) Cin+$K_0$Cin)) or $O_1$=XOR ($A_1$, $K_1$, ($A_0$(~$K_0$)+$A_0$Cin+(~$K_0$)Cin)) if constant is subtrahend or minuend respectively, step 119 or 120. Another loop is run, step 122 or 123 to select a function value g for all the odd bits from the functions F22, F20, F18, F16, F14, F12, F10, F8 (if constant is subtrahend) or F23, F21, F19, F17, F15, F13, F11, F9 (if constant is minuend) depending on the value of $K_i$, $K_{i-1}$ and $K_{i-2}$ by selecting a column from the tables 5 or 6, step 125 or 126. The output function thus obtained is stored in the LUT and the inputs $a_i$, $a_{i-1}$, $a_{i-2}$ and Oi-2 are connected to the inputs of respective LUT and Oi with its output, step 128 or 129. The process is repeated for all odd bits.

Addition of A and K is explained with the help of an example. Let

Cin=0,
A=10101010,
K=11001100, and
O=01110110.

The LSB $O_0$ and $O_1$ are calculated by the following formulae:

$O_0$=XOR ($A_0$, $K_0$, Cin), $O_1$=XOR ($A_1$, $K_1$, ($A_0K_0+A_0$Cin+$K_0$Cin)).

There onwards, $O_i$ is calculated through the function that is based on the values of constant coefficient bits ($K_i$, $K_{i-1}$, $K_{i-2}$). $O_i$ is located in the corresponding row of $a_{i-2}$, $O_{i-2}$, $a_{i-1}$ and $a_i$ as given in table 1.

TABLE 4

A + K

| $a_{i-2}$ | $O_{i-2}$ | $a_{i-1}$ | $a_i$ | Ki-2 Ki-1 Ki | 000 F7 | 001 F6 | 010 F5 | 011 F4 | 100 F3 | 101 F2 | 110 F1 | 111 F0 |
|---|---|---|---|---|---|---|---|---|---|---|---|---|
| 0 | 0 | 0 | 0 | | 0 | 1 | 0 | 1 | 0 | 1 | 1 | 0 |
| 0 | 0 | 0 | 1 | | 1 | 0 | 1 | 0 | 1 | 0 | 0 | 1 |
| 0 | 0 | 1 | 0 | | 0 | 1 | 1 | 0 | 1 | 0 | 1 | 0 |
| 0 | 0 | 1 | 1 | | 1 | 0 | 0 | 1 | 0 | 1 | 0 | 1 |
| 0 | 1 | 0 | 0 | | 0 | 1 | 0 | 1 | 0 | 1 | 0 | 1 |
| 0 | 1 | 0 | 1 | | 1 | 0 | 1 | 0 | 1 | 0 | 1 | 0 |
| 0 | 1 | 1 | 0 | | 0 | 1 | 1 | 0 | 0 | 1 | 1 | 0 |
| 0 | 1 | 1 | 1 | | 1 | 0 | 0 | 1 | 1 | 0 | 0 | 1 |
| 1 | 0 | 0 | 0 | | 0 | 1 | 1 | 0 | 0 | 1 | 1 | 0 |
| 1 | 0 | 0 | 1 | | 1 | 0 | 0 | 1 | 1 | 0 | 0 | 1 |
| 1 | 0 | 1 | 0 | | 1 | 0 | 1 | 0 | 1 | 0 | 1 | 0 |
| 1 | 0 | 1 | 1 | | 0 | 1 | 0 | 1 | 0 | 1 | 0 | 1 |
| 1 | 1 | 0 | 0 | | 0 | 1 | 0 | 1 | 0 | 1 | 1 | 0 |
| 1 | 1 | 0 | 1 | | 1 | 0 | 1 | 0 | 1 | 0 | 0 | 1 |
| 1 | 1 | 1 | 0 | | 0 | 1 | 1 | 0 | 1 | 0 | 1 | 0 |
| 1 | 1 | 1 | 1 | | 1 | 0 | 0 | 1 | 0 | 1 | 0 | 1 |

Table 5: Function values for Subtractor (A–K).
An example for A–K where:
Bin=0,
A=10101010,
K=11001100,
O=11011110.
The LSB $O_0$ and $O_1$ are calculated by the following formulae.

$$O_0 = XOR(A_0, K_0, Cin)$$

$$O_1 = XOR(A_1, K_1, ((\sim A_0)K0 + (\sim A_0)Cin + K_0 Cin))$$

There onwards, $O_i$ is calculated through the function that is based on the values of constant coefficient bits ($K_i, K_{i-1}, K_{i-2}$). Oi is located in the corresponding row of $a_{i-2}, O_{i-2}, a_{i-1}$ and $a_i$ as given in table 2.

An example for K-A where:
Bin=0,
K=10101010,
A=11001100,
O=11011110.
The LSB $O_0$ and $O_1$ are calculated by the following formulae:

$$O_0 = XOR(A_0, K_0, Cin).$$

$$O_1 = XOR(A_1, K_1, (A_0(\sim K_0) + A_0 Cin + (\sim K_0)Cin)).$$

There onwards, $O_i$ is calculated through the function that is based on the values of constant coefficient bits ($K_i, K_{i-1}, K_{i-2}$). $O_i$ is located in the corresponding row of $a_{i-2}, O_{i-2}, a_{i-1}$ and $a_i$ as given in table 6.

TABLE 5

A − K

| $a_{i-2}$ | $O_{i-2}$ | $a_{i-1}$ | $a_i$ | Ki-2 Ki-1 Ki | 000 F22 | 001 F20 | 010 F18 | 011 F16 | 100 F14 | 101 F12 | 110 F10 | 111 F8 |
|---|---|---|---|---|---|---|---|---|---|---|---|---|
| 0 | 0 | 0 | 0 | | 0 | 1 | 1 | 0 | 1 | 0 | 1 | 0 |
| 0 | 0 | 0 | 1 | | 1 | 0 | 0 | 1 | 0 | 1 | 0 | 1 |
| 0 | 0 | 1 | 0 | | 0 | 1 | 0 | 1 | 0 | 1 | 1 | 0 |
| 0 | 0 | 1 | 1 | | 1 | 0 | 1 | 0 | 1 | 0 | 0 | 1 |
| 0 | 1 | 0 | 0 | | 1 | 0 | 1 | 0 | 1 | 0 | 1 | 0 |
| 0 | 1 | 0 | 1 | | 0 | 1 | 0 | 1 | 0 | 1 | 0 | 1 |
| 0 | 1 | 1 | 0 | | 0 | 1 | 0 | 1 | 0 | 0 | 1 | 0 |
| 0 | 1 | 1 | 1 | | 1 | 0 | 0 | 1 | 1 | 0 | 0 | 1 |
| 1 | 0 | 0 | 0 | | 0 | 1 | 1 | 0 | 0 | 1 | 1 | 0 |
| 1 | 0 | 0 | 1 | | 1 | 0 | 0 | 1 | 1 | 0 | 0 | 1 |
| 1 | 0 | 1 | 0 | | 0 | 1 | 0 | 1 | 0 | 1 | 0 | 1 |
| 1 | 0 | 1 | 1 | | 1 | 0 | 1 | 0 | 1 | 0 | 1 | 0 |
| 1 | 1 | 0 | 0 | | 0 | 1 | 1 | 0 | 0 | 1 | 0 | 0 |
| 1 | 1 | 0 | 1 | | 1 | 0 | 0 | 1 | 1 | 0 | 0 | 1 |
| 1 | 1 | 1 | 0 | | 0 | 1 | 0 | 1 | 0 | 1 | 1 | 0 |
| 1 | 1 | 1 | 1 | | 1 | 0 | 1 | 0 | 1 | 0 | 0 | 1 |

TABLE 6

| | | | | | | | K - A | | | | |
|---|---|---|---|---|---|---|---|---|---|---|---|
| | Ki − 2 | Ki − 1 | Ki | | 000 | 001 | 010 | 011 | 100 | 101 | 110 | 111 |
| $a_{i-2}$ | $O_{i-2}$ | $a_{i-1}$ | $a_i$ | F23 | F21 | F19 | F17 | F15 | F13 | F11 | F9 |
| 0 | 0 | 0 | 0 | 0 | 1 | 0 | 1 | 0 | 1 | 0 | 1 |
| 0 | 0 | 0 | 1 | 1 | 0 | 1 | 0 | 1 | 0 | 1 | 0 |
| 0 | 0 | 1 | 0 | 1 | 0 | 0 | 1 | 1 | 0 | 0 | 1 |
| 0 | 0 | 1 | 1 | 0 | 1 | 1 | 0 | 0 | 1 | 1 | 0 |
| 0 | 1 | 0 | 0 | 1 | 0 | 0 | 1 | 0 | 1 | 0 | 1 |
| 0 | 1 | 0 | 1 | 0 | 1 | 1 | 0 | 1 | 0 | 1 | 0 |
| 0 | 1 | 1 | 0 | 1 | 0 | 1 | 0 | 1 | 0 | 0 | 1 |
| 0 | 1 | 1 | 1 | 0 | 1 | 0 | 1 | 0 | 1 | 1 | 0 |
| 1 | 0 | 0 | 0 | 1 | 0 | 0 | 1 | 0 | 1 | 0 | 1 |
| 1 | 0 | 0 | 1 | 0 | 1 | 1 | 0 | 1 | 0 | 1 | 0 |
| 1 | 0 | 1 | 0 | 1 | 0 | 1 | 0 | 1 | 0 | 0 | 1 |
| 1 | 0 | 1 | 1 | 0 | 1 | 0 | 1 | 0 | 1 | 1 | 0 |
| 1 | 1 | 0 | 0 | 1 | 0 | 0 | 1 | 1 | 0 | 0 | 1 |
| 1 | 1 | 0 | 1 | 0 | 1 | 1 | 0 | 0 | 1 | 1 | 0 |
| 1 | 1 | 1 | 0 | 1 | 0 | 1 | 0 | 1 | 0 | 1 | 0 |
| 1 | 1 | 1 | 1 | 0 | 1 | 0 | 1 | 0 | 1 | 0 | 1 |

| | W/o dynamic add/sub | | | With dynamic add/sub | | |
|---|---|---|---|---|---|---|
| | 4-LUT Count | LUT mode | Post Mapping Optimization | 4-LUT Count | LUT mode | Post Mapping Optimization |
| Technique 1 | N + 1 | Arithmetic | Not Possible | N + 1 | Arithmetic | Not Possible |
| Technique 2 | N + N/3 | Normal | Possible | N + N/2 | Normal | Possible |
| Proposed Technique | N + 1 | Normal | Possible | N + 1 | Normal | Possible |

| | LUT Count | Delay | Routing Resource | LUT mode | Post Mapping Optimization |
|---|---|---|---|---|---|
| Technique 1 | N + 1 | N + 1 | Carry Chain | Arithmetic | Not Possible |
| Technique 2 | N + N/3 | N/3 | *Direct Interconnect/ Feedback | Normal | Possible |
| Proposed Technique | N + 1 | N/2 | *Cascade Chain | Normal | Possible |

*Since the delay of the cascade chain/carry chain is extremely less as compared to other routing resources, including direct interconnect, the proposed technique using cascade chain yields a delay-optimized implementation compared to technique 2.

Advantages over Prior Art

The method discussed above eliminates the need to embed extra logic in logic cell to support the generation of two functions from a single LUT, i.e. support of arithmetic mode. Besides need for arithmetic mode, it also eliminates the requirement of carry chains to propagate carry output.

The LUTs used for implementation are single output LUTS, therefore for N-bit addition/subtraction at least N+1 LUTs are used, N LUTs for N-bit addition and one LUT for generation of carry out bit. Thus, an important advantage of this approach is that without even support of arithmetic mode, an N-bit constant coefficient adder/subtractor can still be implemented in N+1 LUTs. The proposed technique also makes 100% utilization of LUT logic, i.e. except the first LUT, all the four inputs of every LUT are utilized.

Since all LUTs are used in normal mode, post-mapping optimization algorithms can be run on an LUT level net list generated by the proposed method. Thus, it still leaves scope for optimization algorithms to merge the logic of adder/subtractor with additional logic.

Since the calculation is performed in two parallel chains, the drawback of carry propagation in a single chain posed by technique 1 is eliminated. And the output can be generated within a maximum delay of N/2. As cascade chains are being used in the proposed technique, it gives far better reduction in delay than technique 2.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An area efficient n-bit constant adder/subtractor, comprising:
a plurality of look-up tables (LUTs) interconnected to each other, each LUT including a first input coupled to a first data input bit, a second input coupled to a second data input bit that is also coupled to a first input of a previous LUT, and a third input coupled to an output of the previous LUT.

2. The area efficient n-bit constant adder/subtractor as claimed in claim 1, further comprising a first LUT having an input that receives a carry input Cin.

3. The area efficient n-bit constant adder/subtractor as claimed in claim 1 wherein a fourth input bit of each said LUT is coupled to a dynamic add/subtract select bit.

4. The area efficient n-bit constant adder/subtractor as claimed in claim 1 wherein addition/subtraction is implemented in an FPGA.

5. An area efficient n-bit constant adder/subtractor as claimed in claim 1 wherein said constant adder/subtractor is configured for dynamic addition/subtraction and further comprises:
   means for setting a defined bit pattern corresponding to a least significant bit output for a first LUT of the plurality of LUTs;
   means for selecting a first output column from a first truth table based on values of $K_i$ and $K_{i-1}$ of an input constant K, where i represents a bit position of a bit of the input constant K;
   means for selecting a second output column from either a second truth table or a third truth table depending upon whether said $K_i$ is a minuend or subtrahend based on the values of $K_i$ and $K_{i-1}$ of the input constant K; and
   means for concatenating values of said first and second columns to construct input bits for an $i^{th}$ LUT of the plurality of LUTs.

6. An area efficient n-bit constant adder/subtractor as claimed in claim 1 wherein said constant adder/subtractor is configured for addition and further comprises:
   means for setting a defined bit pattern corresponding to a least significant bit output for a first LUT of the plurality of LUTs; and
   means for selecting an output column from a truth table based on values of $K_i$ and $K_{i-1}$ of an input constant K, where i represents a bit position of a bit of the input constant K.

7. The area efficient n-bit constant adder/subtractor as claimed in claim 1 wherein said constant adder/subtractor is configured for subtraction and comprises:
   means for setting a defined bit pattern corresponding to a least significant bit output for a first LUT of the plurality of LUTs; and
   means for selecting an output column from either a first truth table or a second truth table depending upon whether a bit $K_i$ of an input constant K is a minuend or subtrahend based on values of $K_i$ and $K_{i-1}$ of the input constant K, where i represents a bit position of a bit of the input constant K.

8. The area efficient n-bit constant adder/subtractor as claimed in claim 7 wherein the means for setting said defined bit pattern includes an XOR truth table.

9. A delay minimized n-bit constant adder/subtractor, comprising:
   a plurality of look-up tables (LUTs) interconnected to each other, each LUT including a first input coupled to an $a_i$ data input bit, a second input coupled to an $a_{i-1}$ data input bit, a third input coupled to an $a_{i-2}$ data input bit, and a fourth input coupled to an output of a previous LUT, where i has a different value for each of the LUTs of the plurality of LUTs.

10. The delay minimized n-bit constant adder/subtractor as claimed in claim 9, further comprising a first LUT having an input that receives a carry input Cin.

11. The delay minimized n-bit constant adder/subtractor as claimed in claim 9 wherein addition/subtraction is implemented in an FPGA.

12. The delay minimized n-bit constant adder/subtractor as claimed in claim 9 wherein said constant adder/subtractor is configured for addition and comprises:
   means for setting a defined first bit pattern corresponding to a least significant bit output of even bits for a first LUT of the plurality of LUTs;
   means for setting a defined second bit pattern corresponding to a penultimate bit output of odd bits for a second LUT of the plurality of LUTs;
   means for selecting an output column from a truth table based on values of $K_i$, $K_{i-1}$ and $K_{i-2}$ of an input constant K, where i represents a bit position of a bit of the input constant K;
   selecting an output column from the truth table based on the values of $K_i$, $K_{i-1}$ and $K_{i-2}$ of the input constant K.

13. The delay minimized n-bit constant adder/subtractor as claimed in claim 12 wherein said means for setting the first bit pattern includes an XOR truth table.

14. The delay minimized n-bit constant adder/subtractor as claimed in claim 12 wherein said second bit pattern is calculated in accordance with:

$$O1 = XOR(A_1, K_1, (A_0K_0 + A_0Cin + K_0Cin)),$$

where $A_0$ is a first non-constant input;
$K_0$ is a first constant input;
$A_1$ is a second non-constant input;
$K_1$ is a second constant input; and
Cin is a carry input.

15. The delay minimized n-bit constant adder/subtractor as claimed in claim 9 wherein said constant adder/subtractor is configured for subtraction and comprises:
   means for setting a defined first bit pattern corresponding to a least significant bit output of even bits for a first LUT of the plurality of LUTs;
   means for setting a defined second bit pattern corresponding to a penultimate bit output of odd bits depending upon whether a bit $K_i$ of an input constant K is a minuend or subtrahend for a second LUT of the plurality of LUTs, where i represents a bit position of a bit of the input constant K;
   means for selecting, for each of remaining even output bits, an output column from a first truth table or a second truth table depending upon whether said $K_i$ is a subtrahend or minuend respectively based on values of $K_i$, $K_{i-1}$ and $K_{i-2}$ of the input constant K;
   means for selecting, for each of remaining odd output bits, an output column from the first or second truth table depending upon whether said $K_i$ is subtrahend or minuend respectively based on the values of $K_i$, $K_{i-1}$ and $K_{i-2}$ of the input constant K.

16. The delay minimized n-bit constant adder/subtractor as claimed in claim 15 wherein said first bit pattern is calculated in accordance with:

$$O_1 = XOR(A_1, K_1, ((\sim A_0)K_0 + (\sim A_0)Cin + K_0Cin)),$$

where $A_0$ is a first non-constant input;
$K_0$ is a first constant input;
$A_1$ is a second non-constant input;
$K_1$ is a second constant input; and
Cin is a carry input.

17. The delay minimized n-bit constant adder/subtractor as claimed in claim 15 wherein said second bit pattern is calculated in accordance with:

$$O_1 = XOR(A_1, K_1, (A_0(\sim K_0) + A_0Cin + (\sim K_0)Cin)),$$

where $A_0$ is a first non-constant input;
$K_0$ is a first constant input;
$A_1$ is a second non-constant input;
$K_1$ is a second constant input; and
Cin is a carry input.

18. A method of implementing an n-bit constant adder/subtractor, the method comprising:
  inputting first and second data input bits into a first look-up table (LUT); and
  inputting, into a second LUT, the second data input bit, a third data input bit, and an output of the first LUT.

19. The method of claim 18, further comprising inputting an add/subtract select bit into the second LUT.

20. The method of claim 18, further comprising configuring the constant adder/subtractor for dynamic addition/subtraction by steps including:
  setting a defined bit pattern corresponding to a least significant bit output for the first LUT;
  for each of remaining output bits:
  selecting a first output column from a first truth table based on values of $K_i$ and $K_{i-1}$ of an input constant K, where i represents a bit position of a bit of the input constant K;
  selecting a second output column from either a second truth table or a third truth table depending upon whether said $K_i$ is a minuend or subtrahend based on the values of $K_i$ and $K_{i-1}$ of the input constant K; and
  concatenating values of said first and second columns to construct input bits for an $i^{th}$ LUT of the plurality of LUTs.

21. The method of claim 18, further comprising configuring the constant adder/subtractor for addition by steps including:
  setting a defined bit pattern corresponding to a least significant bit output for the first LUT; and
  for each of remaining output bits, selecting an output column from a first truth table based on values of $K_i$ and $K_{i-1}$ of an input constant K, where i represents a bit position of a bit of the input constant K.

22. The method of claim 18, further comprising configuring the constant adder/subtractor for subtraction by steps including:
  setting a defined bit pattern corresponding to a least significant bit output for the first LUT; and
  for each of remaining output bits, selecting an output column from either a first truth table or a second truth table depending upon whether a bit $K_i$ of an input constant K is a minuend or subtrahend based on values of $K_i$ and $K_{i-1}$ of the input constant K, where i represents a bit position of a bit of the input constant K.

* * * * *